United States Patent
Wiker et al.

(10) Patent No.: US 7,372,226 B2
(45) Date of Patent: May 13, 2008

(54) METHOD FOR SWITCHING OFF A POWER TOOL

(75) Inventors: Juergen Wiker, Leinfelden-Echterdingen (DE); Dietmar Hahn, Gerlingen (DE); Mario Pauli, Gundelsheim (DE); Roland Walter, Tiefenbronn (DE); Andreas Heilmann, Borsderf (DE)

(73) Assignee: Robert Bosch GmbH, Stuttgart (DE)

( * ) Notice: Subject to any disclaimer, the term of this patent is extended or adjusted under 35 U.S.C. 154(b) by 103 days.

(21) Appl. No.: 10/557,936

(22) PCT Filed: Nov. 30, 2004

(86) PCT No.: PCT/EP2004/053181

§ 371 (c)(1), (2), (4) Date: Nov. 22, 2005

(87) PCT Pub. No.: WO2005/072908

PCT Pub. Date: Aug. 11, 2005

(65) Prior Publication Data

US 2007/0068480 A1    Mar. 29, 2007

(30) Foreign Application Priority Data

Jan. 28, 2004   (DE)   ............... 10 2004 004 170

(51) Int. Cl.
*H02P 3/00*   (2006.01)
(52) U.S. Cl. ............... 318/367; 318/461; 318/275; 318/458
(58) Field of Classification Search ............... 318/461; 173/181, 176, 179
See application file for complete search history.

(56) References Cited

U.S. PATENT DOCUMENTS

| 4,249,117 | A | * | 2/1981 | Leukhardt et al. | ............ 318/275 |
| 4,267,914 | A | | 5/1981 | Saar | |
| RE33,379 | E | * | 10/1990 | Bradus | ............ 388/812 |
| 6,479,958 | B1 | | 11/2002 | Thompson et al. | |

* cited by examiner

*Primary Examiner*—Lincoln Donovan
*Assistant Examiner*—Michael Brandt
(74) *Attorney, Agent, or Firm*—Michael J. Striker

(57) ABSTRACT

In a method for shutting off a drive motor (12) of a power tool that drives a tool, the drive motor (12) is shut off as a function of a variable threshold value ($E_1$) if the tool jams. The threshold value ($E_1$) is determined in at least one predetermined time interval ($T_1$) as a function of a current load speed ($n_1$) and a no-load speed ($n_0$).

9 Claims, 3 Drawing Sheets

METHOD FOR SWITCHING OFF A POWER TOOL

BACKGROUND OF THE INVENTION

The present invention is based on a method for shutting off a power tool when jammed, and a power tool.

Power tools with digital control are known. With mains-operated power tools, the voltage supplied to the drive motor is changed, e.g., via phase-angle control, while, with power tools powered by rechargeable batteries or batteries, pulse-width modulation is typically used to change the voltage. In various applications, a tool can easily become jammed in a work piece, which can result in rotational motion or "kick-back" of the power tool and a resultant loss of control of the power tool. Various systems and methods are known with which rotational motion and/or kick-back of the power tool that occurs when the tool becomes jammed can be prevented. Anti-rotation systems and methods are therefore known with which the course of rotational speed over time of the drive motor or the tool is evaluated as a function of time.

A power tool is made known in U.S. Pat. No. 4,267,914, with which the drive motor is shut off and/or a brake is activated when the rotational speed falls below a predetermined fixed or variable threshold value and a jam is therefore detected.

SUMMARY OF THE INVENTION

It is provided that, with a method for shutting off a drive motor of a power tool as a function of a variable threshold value, the threshold value is determined in at least one predetermined time interval as a function of a current load speed and a no-load speed. The threshold value can be determined as a rotational-speed signal, as the derivative with respect to time of a rotational speed, and/or as a value in a table based on rotational speed. The shutting-off of the drive motor as a function of a threshold value determined in a variable manner takes place such that it is automatically adapted to the instantaneous load and/or working conditions of the drive motor. Particularly favorably, the present invention can be realized in power tools with digital control, with which the method can be implemented using an algorithm stored in a storage medium. With power tools with additional rotational-speed preselection capability, the corresponding algorithm of a corresponding control unit need not be changed. Advantageously, further operating parameters of the power tool can also be taken into account, such as a transmission, a transmission ratio, a mass ratio of the power tool and/or other variables that affect the machining procedure, preferably machine-related variables.

Preferably, the threshold value is determined in at least one predetermined time interval as a function of a rotational-speed ratio of the current load speed and the no-load speed. If an observation of a current rotational-speed signal reveals that the threshold value has been reached or exceeded, this is recognized as a jam, and the drive motor is immediately cut off from its power supply. As a result, an uncontrolled motion of the power tool and the risks associated therewith can be prevented. As an option, a current rotational-speed change signal can be observed and checked to determine whether a threshold value related to change in rotational speed has been reached or exceeded. In the case of a rotational-speed signal, exceeding the threshold value means that a difference of a current load speed in two consecutive time intervals is greater than the threshold value. In the case of a change in rotational speed, exceeding the threshold value means the current change in rotational speed is greater than the corresponding threshold value, i.e., the change is steeper than is permitted.

The threshold value is preferably calculated as a product of the speed ratio and a starting value. The starting value can be a predetermined starting value or, preferably, the threshold value that was determined in the previous time interval. The starting value can be a rotational speed or a change in rotational speed, in particular a reduction in rotational speed. A favorable time interval is, e.g., a half wave of a mains frequency in the case of mains-operated power tools. With cordless power tools, a time interval can be generated artificially, e.g., via a quartz or RC (resistance capacitance) oscillator circuit.

As an alternative, the threshold value can be calculated as the rate of change with respect to time normalized for the no-load speed. In doing so, a derivative with respect to time of a current load speed of the entire system is compared with a threshold value normalized for a no-load speed. The no-load speed enters into the threshold value as the setpoint value, the no-load value being predetermined or preselected. Further operating parameters of the power tool, such as the transmission, mass ratio and the like, also enter into the threshold value. Based on this, a theoretically permissible rate of change of the rotational-value signal is determined, with which the current change in load speed is compared. It can also be provided that influencing variables are taken into account in the determination of the threshold value and/or the setpoint value that are based on a specific operator, e.g., his operating force or whether work is carried out in a gentle or robust manner.

As an alternative, to shut off a drive motor of a power tool when a jam occurs, a current load speed can be compared with a numerical interval listed in a table and assigned to the new threshold value. The table preferably contains rotational-speed threshold values for a no-load speed and a load speed. The exact parameters depend on the particular power tool and are advantageously determined in an empirical manner. Preferably, at low load speeds, the threshold value is lowered as a function of a selectable factor. It is then possible to take the operator's operating force or comfort level into account. The factor can be preselected using a selector switch. The threshold value can be reduced, e.g., in a superproportional or underproportional manner. As an alternative, a learning algorithm can be provided in a corresponding control unit.

Advantageously, the threshold value is rounded to a whole number, particularly after multiplication. It is also favorable for a setpoint/actual deviation of a rotational-speed regulator, a correction level of the rotational-speed regulator and/or a mechanical time constant of the power tool to enter into the determination of the threshold value.

The jam can be easily determined by counting rotational speed pulses in two consecutive first and second time intervals, then subtracting the pulses counted in the second time interval from the pulses counted in the first time interval. If the difference is greater than the threshold value, the drive motor is shut off.

To comfortably adjust a current load condition, it is favorable to weight the threshold value with a setpoint/actual deviation of a rotational-speed regulator and/or a mechanical time constant of the power tool, and/or operating parameters of the power tools.

Furthermore, a power tool with a tool capable of being driven by a drive motor is provided, which includes means such as detection units and/or arithmetic-logic units to determine at least one threshold value which is a function of at least two variables. Favorably, the means include a microcontroller connected with a rotational-speed detection unit and a speed regulator, it being possible to determine the threshold value in a variable manner based on a rotational-speed signal and/or a rotational-speed change signal from the rotational-speed detection unit, and a setpoint/actual deviation of a speed regulator and/or a correction level of the rotational-speed regulator, and/or a mechanical time constant of the power tool. As such, a current load condition or working condition of the power tool can be taken into account in a reliable manner. It is advantageous when the means include a rotational-speed regulating electronic unit for controlling motor voltage and/or motor current.

The present invention is favorable for use with power tools with digital control and is suited, in particular, for use with power tools with tools that can jam, e.g., power tools with rotatably driven tools, such as drills with and without an impact mechanism, saws, and the like.

BRIEF DESCRIPTION OF THE DRAWINGS

The present invention is explained below in greater detail in an exemplary embodiment, with reference to the attached drawing.

DETAILED DESCRIPTION OF THE EXEMPLARY EMBODIMENTS

Figure 1:
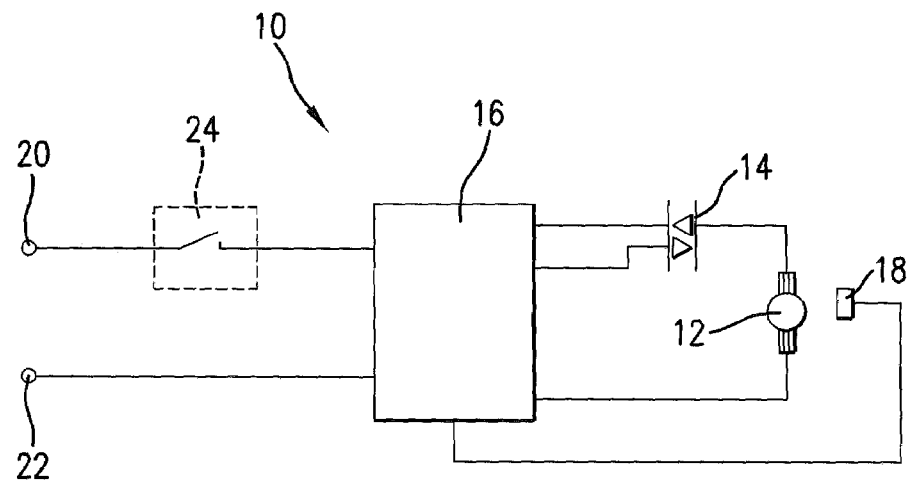
FIG. 1 Shows a schematic depiction of a circuit of a power tool for detecting a jam.

FIG. 1 shows a schematic depiction of a circuit 10 of a power tool for detecting a jam. The circuit includes means for detecting and/or calculating a threshold value $E_1$ which is a function of at least two variables, the threshold value $E_1$ serving as a criterium for detecting a jam and shutting off a drive motor 12.

An effective electrical voltage U supplied to a drive motor 12 is adjusted using a composite power semiconductor device 14, e.g., a TRIAC, a thyristor or, particularly with mains-independent power tools, a field effect transistor, which, in turn, is controlled via a microcontroller unit 16. Microcontroller unit 16 receives a rotational-speed signal via a rotational-speed detection unit 18, e.g., a rotational-speed sensor designed as a tachogenerator, or a rotational-speed detection circuit, by detecting an angular speed of a motor shaft of drive motor 12 or a suitable component via a corresponding sensor, e.g., a trigger wheel. If a jam of a tool of the power tool is detected, a switch 24 in an electric circuit of drive motor 12 is opened and drive motor 12 is de-energized. To detect when a tool is jammed, rotational-speed signal $n_1$ is evaluated in suitable time intervals.

Figure 2A:
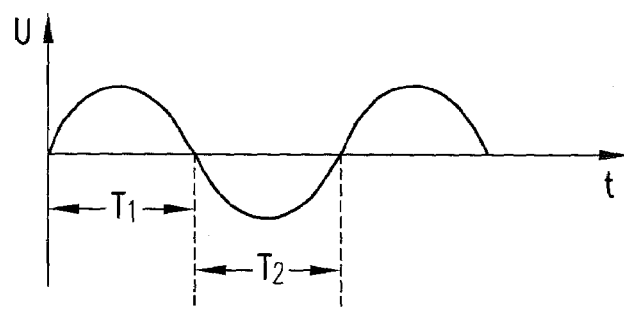
FIGS. 2*a, b* Show a graph of voltage as a function of time (a) and corresponding pulses of a tachogenerator, as a function of time (b)
Figure 2B:
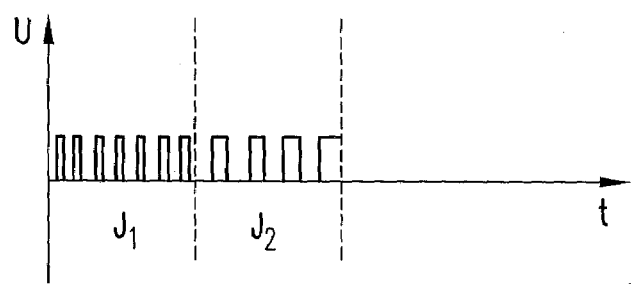

FIGS. 2*a, b* show, as an example, a rotational-speed signal when rotational speed is reduced from a number of pulses $J_1$ in an interval $T_1$ to a number of pulses $J_2$ in an interval $T_2$. In each case, one time interval $T_1$, $T_2$ corresponds to a half wave of the mains frequency. The number of pulses $J_2$ is subtracted from the number of pulses $J_1$ in a control unit, which is preferably implemented in microcontroller unit 16. If a difference results that is greater than a previously-calculated threshold value $E_1$, microcontroller unit 16 shuts off drive motor 12 using composite power semiconductor device 14. Once the jam is detected, the power tool is immediately cut off from the power supply.

Figure 3:
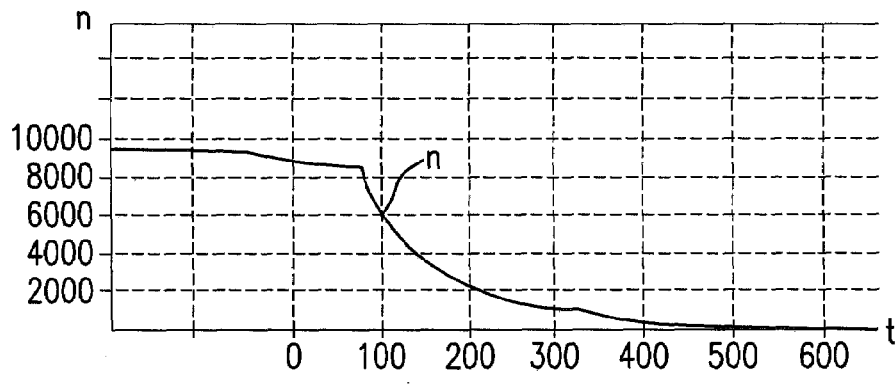
FIG. 3 Shows a graph of rotational speed as a function of time

FIG. 3 shows a typical example of a graph of rotational speed as a function of time when a tool of a power tool becomes jammed. The rotational speed slows down in a non-linear manner, and the reduction in rotational speed as a function of time differs with different starting values for rotational speed. In practice, this means a variable threshold value $E_1$ automatically takes this non-linear reduction in rotational speed into account as a function of the ratio of load speed $n_1$ to a preselected or fixedly predetermined no-load speed no of power tool, threshold value $E_1$ being determined, according to a preferred exemplary embodiment of the present invention, as a function of the rotational-speed ratio $n_1/n_0$.

Figure 4:
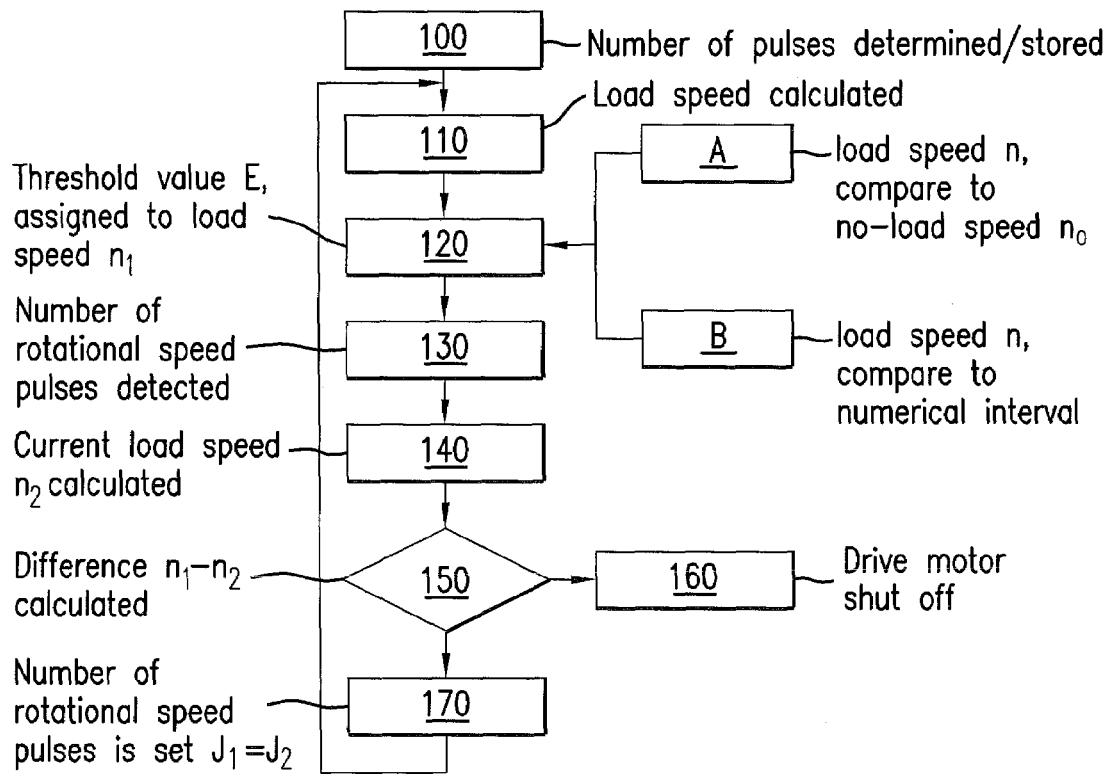
FIG. 4 Shows a flow chart for determining a jam, according to a preferred method.

FIG. 4 shows a flow chart for determination of a jam, with steps 100, 110, 120, 130, 140, 150, 160, 170. The process can be stored, e.g., as an algorithm in a control unit of the power tool. First, in step 100, in a time interval $T_1$, the number of pulses $J_1$ detected, e.g., by a rotational-speed sensor, is determined and stored. If a trigger wheel is used as the rotational-speed sensor, for example, one full revolution of the trigger wheel generates the same number of pulses J as the number of teeth on the trigger wheel. In the next step 110, a current load speed $n_0$ is therefore calculated based on the number of pulses $J_1$ counted. In the next step 120, threshold value $E_1$ is assigned to current load speed $n_1$. This can be accomplished in many ways, as indicated by blocks A, B.

In block A, current load speed $n_1$ is compared with a no-load speed $n_0$ of the total system of the power tool, and the quotient is calculated, the quotient representing rotational-speed ratio $n_1/n_0$. Rotational-speed ratio $n_1/n_0$ is multiplied by a starting value $E_0$ and, with this, the new threshold value $E_1$ for current time interval $T_1$ is determined. Starting value $E_0$ can be specified as the starting value at the beginning. Subsequently, a threshold value $E_1$ calculated in a previous time interval $T_{n-x}$ can be established as starting value $E_0$ in a current time interval $T_n$.

In a preferred alternative embodiment, in block B, a current load speed $n_1$ can be compared with a numerical interval listed in a table and assigned to the particular new threshold value $E_1$. The table is preferably stored in a memory component of a control unit of the power tool. The table contains empirically determined rotational-speed cut-off values as threshold values for the no-load speed and the current load speed. The no-load speed can be a function, e.g., of a working condition or a tool that is used. Furthermore, the operator's "feel" or his operating force or the like can be taken into account, e.g., by reducing threshold value $E_1$ in a superproportional or underproportional manner at lower load speeds $n_1$.

Threshold value $E_1$ calculated in block A or B is forwarded to step 120 and assigned to current load speed $n_1$.

In the next step 130, during second time interval $T_2$, which follows first time interval $T_1$, the number of rotational-speed pulses $J_2$, e.g., detected by a rotational-speed sensor, are determined and stored. In the next step 140, a current load speed $n_2$ is calculated based on the number of pulses $J_2$ counted.

In the next step 150, the difference $n_1-n_2$ between rotational speed $n_1$ determined in first time interval $T_1$ and load speed $n_2$ determined in second time interval $T_2$ is calculated.

If difference $n_1-n_2$ is greater than threshold value $E_1$, the drive motor is shut off in step 160. If difference $n_1-n_2$ is not greater than $E_1$, the number of rotational-speed pulses is set $J_1=J_2$. Furthermore, threshold value $E_1$ is set equal to $E_0$ and returned to the sequence between step 100 and step 110 as starting value $E_0$.

Figure 5:
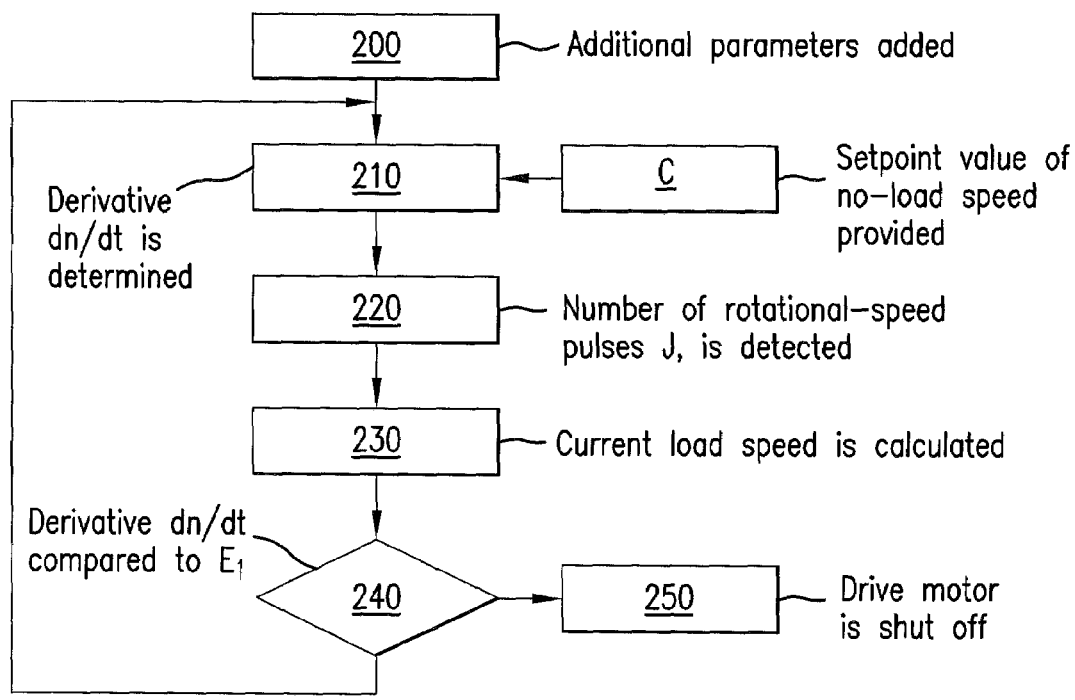
FIG. 5 Shows a flow chart of an alternative determination of a jam, according to a preferred method.

In a further preferred alternative embodiment, as shown in FIG. 5, a variable threshold value $E_1=dn/dt$ can be determined by determining, in step 120, a derivative with respect to time $dn/dt$ of a limiting value normalized for no-load speed $n_0$. Threshold value $E_1$ is a critical angle in a rotational-speed change/time diagram at which a rotational speed may drop off. If load speed $n_1$ changes with a flatter angle, this represents a permissible state, and the drive motor can continue to operate. If the reduction is steeper, this is recognized as a jam and the drive motor is shut off. To this end, a setpoint value of no-load speed $n_0$ is provided in block C. In step 220, in a time interval $T_1$, the number of rotational-speed pulses $J_1$ detected, e.g., by a rotational-speed sensor, is determined and stored. Subsequently, in step 230, current load speed $n_1$ is calculated, as described in step 110 of the exemplary embodiment in FIG. 4. In step 240, the derivate with respect to time $dn_1/dt$ is compared with threshold value $E_1$. If the value of $dn_1/dt$ is greater than or equal to $E_1$, the drive motor is shut off in step 250. If the derivative with respect to time $dn_1/dt$ is below threshold value $E_1$, the procedure starts again at step 210. Additional parameters can be added in step 200 for calculation purposes, the additional parameters representing influential physical variables such as a transmission, transmission ratio, mass ratio and the like. The critical angle can be determined over a plurality of time intervals or in an on-going manner in an on-going working procedure, or only at certain points in time. This can be adapted as needed.

In general, the determination of threshold value $E_1$ can be carried out continually or only from time to time. Time intervals $T_1$, $T_2$ can be selected as needed and can also be varied depending on the working conditions.

Furthermore, a setpoint/actual deviation of a rotational-speed regulator and/or a correction level of the rotational-speed regulator and/or a mechanical time constant of the power tool can enter into the determination of threshold value $E_1$. The setpoint/actual deviation of the rotational-speed regulator or its correction level is preferably taken into account by expressing current load speed $n_1$ or its rate of change with respect to time $dn_1/dt$ in terms of a no-load speed $n_0$. The mechanical time constant can differ with different insertion tools and, e.g., be taken into account very favorably in the selection of suitable time intervals $T_1$, $T_2$. This can be input to the control unit of the power tool, e.g., using a selector switch.

What is claimed is:

1. A method for shutting off a drive motor (12) of a power tool that drives a tool, the drive motor (12) being shut off as a function of a variable threshold value ($E_1$) if the tool jams, wherein the threshold value ($E_1$) is determined in at least one predetermined time interval ($T_1$) as a function of a current load speed ($n_1$) and a no-load speed ($n_0$), wherein a current load speed ($n_1$) is compared with a numerical interval listed in a table—the numerical interval relating to either a load speed or a no-load speed—and is assigned to the new threshold value ($E_1$), and wherein, at low load speeds ($n_1$), the threshold value ($E_1$) is lowered as a function of a selectable factor.

2. The method as recited in claim 1 wherein the threshold value ($E_1$) is determined as a function of a speed ratio ($n_1/n_0$) of the current load speed ($n_1$) and the no-load speed ($n_0$).

3. The method as recited in claim 1 wherein the threshold value ($E_1$) is calculated as a product of the speed ratio ($n_1/n_0$) and a starting value ($E_0$).

4. The method as recited in claim 1 wherein the threshold value ($E_1$) is calculated as the rate of change of a rotational speed ($dn/dt$) with respect to time normalized for the no-load speed ($n_0$). speeds($n_1$), the threshold value ($E_1$) is lowered as a function of a selectable factor.

5. The method as recited in claim 1, wherein the threshold value ($E_1$) is rounded to a whole number.

6. The method as recited in claim 1, wherein the threshold value ($E_1$) is weighted with a setpoint/actual deviation of a rotational-speed regulator and/or a mechanical time constant of the power tool, and/or operating parameters of the power tools.

7. A method for shutting off a drive motor (12) of a power tool that drives a tool, the drive motor (12) being shut off as a function of a variable threshold value ($E_1$) if the tool jams wherein the threshold value ($E_1$) is determined in at least one predetermined time interval ($T_1$) as a function of a current load speed ($n_1$) and a no-load speed ($n_0$), wherein rotational speed pulses ($J_1$, $J_2$) are counted in two consecutive first and second time intervals ($T_1$, $T_2$) and are subsequently used to determine the speeds ($n_1$ $n_2$), the rotational speed ($n_2$) determined in the second time interval ($T_2$) being subtracted from the rotational speed ($n_1$) determined in the first time interval ($T_1$) and, if the difference ($n_1-n_2$) is greater than the threshold value ($E_1$), the drive motor (12) is shut off.

8. A power tool with a tool that is drivable by a drive motor, comprising:

means for shutting off the drive motor (12) as a function of a variable threshold value ($E_1$) if the tool is jammed, wherein the threshold value ($E_1$) is determined in at least one predetermined time interval ($T_1$) as a function of a current load speed ($n_1$) and a no-load speed ($n_0$), wherein a current load speed ($n_1$) is compared with a numerical interval listed in a table—the numerical interval relating to either a load speed or a no-load speed—and is assigned to the new threshold value ($E_1$), and wherein_at low load speeds($n_1$), the threshold value ($E_1$) is lowered as a function of a selectable factor.

9. A power tool with a tool that is drivable by a drive motor, comprising:

means for shutting off the drive motor (12) as a function of a variable threshold value ($E_1$) if the tool is jammed, wherein the threshold value ($E_1$) is determined in at least one predetermined time interval ($T_1$) as a function of a current load speed ($n_1$) and a no-load speed ($n_0$), wherein rotational speed pulses ($j_1$, $J_2$) are counted in two consecutive first and second time intervals ($T_1$, $T_2$) and are subsequently used to determine the speeds ($n_1$ $n_2$), the rotational speed ($n_2$) determined in the second time interval ($T_2$) being subtracted from the rotational speed ($n_1$) determined in the first time interval ($T_1$) and, if the difference ($n_1-n_2$) is greater than the threshold value ($E_1$), the drive motor (12) is shutoff.

* * * * *